United States Patent [19]
Bowen et al.

[11] 3,971,564
[45] July 27, 1976

[54] ENVIRONMENTAL SEALS FOR MULTIDIRECTIONAL CONTROL LEVERS

[75] Inventors: Robert B. Bowen, Edwards; Roger F. Maier, Peoria; John R. Rediger, Washington, all of Ill.

[73] Assignee: Caterpillar Tractor Co., Peoria, Ill.

[22] Filed: May 24, 1974

[21] Appl. No.: 473,139

[52] U.S. Cl.................................... 277/30; 277/99; 277/100
[51] Int. Cl.²......................................... F16J 15/16
[58] Field of Search ...................... 277/30, 97–100, 277/212 FB

[56] References Cited
UNITED STATES PATENTS

| | | | |
|---|---|---|---|
| 3,179,423 | 4/1965 | McCloud | 277/30 |
| 3,748,923 | 7/1973 | Babbitt et al. | 277/100 X |

Primary Examiner—Richard E. Aegerter
Assistant Examiner—Frederick R. Schmidt
Attorney, Agent, or Firm—Wegner, Stellman, McCord, Wiles & Wood

[57] ABSTRACT

An environmental seal for use with a multidirectional control lever. The seal defines a movable structure including a first closure portion movable with the movable member and a second closure portion cooperating with the first closure portion to effectively maintain an opening through which the movable member extends sealingly closed in all positions of the movable member. The seal includes only two slidable closure elements for effectively sealing the opening in all positions of the movable member. Spring biasing structure may be provided for biasing the closure elements into movable sealed engagement.

16 Claims, 6 Drawing Figures

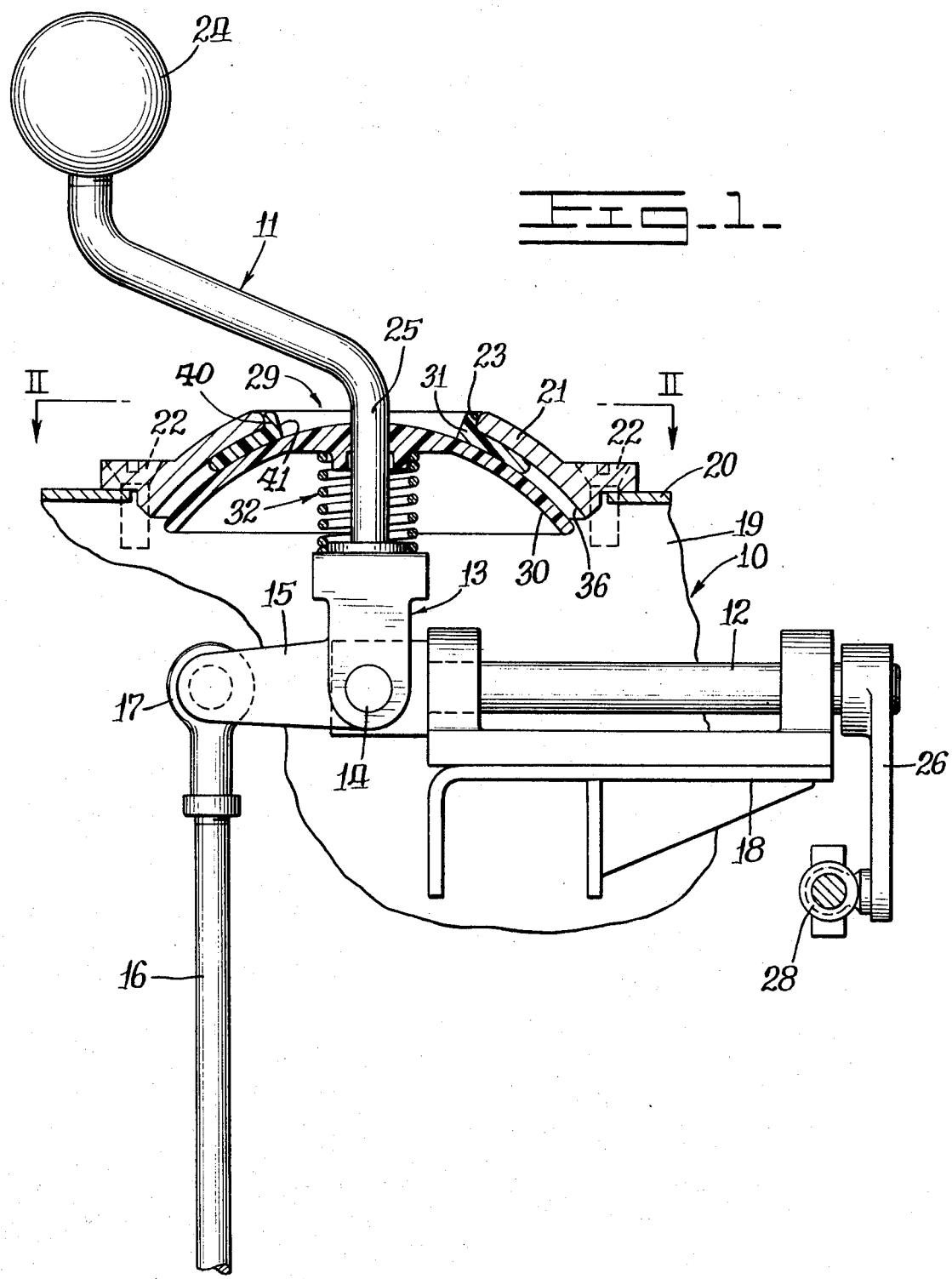

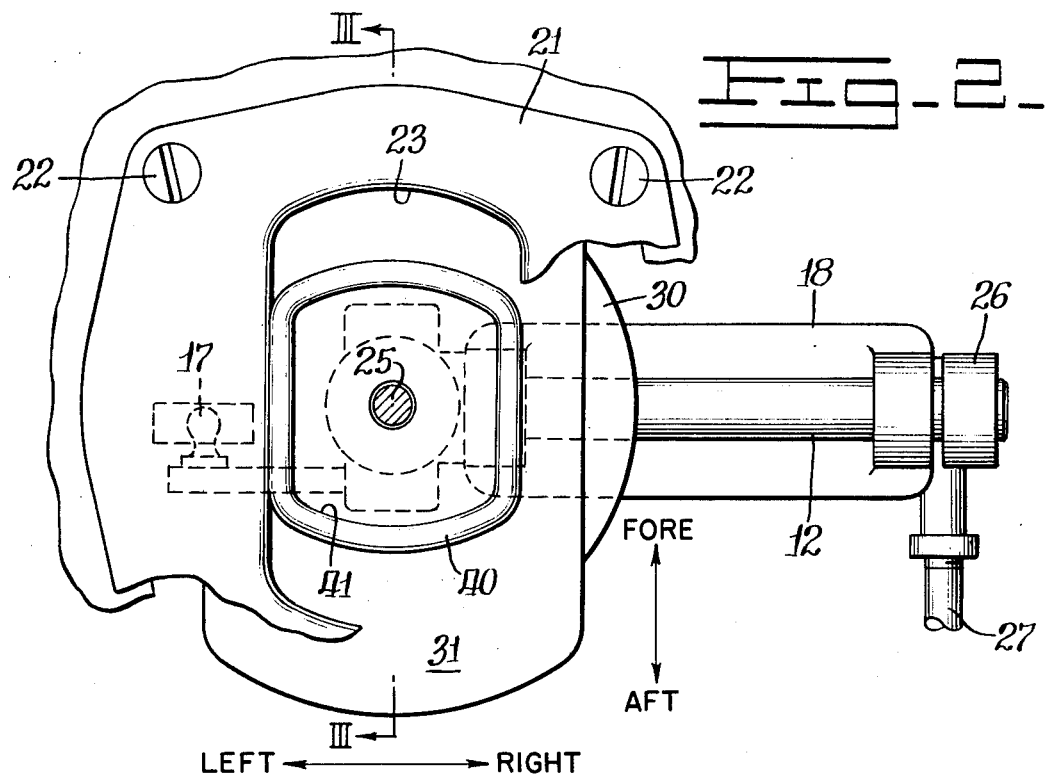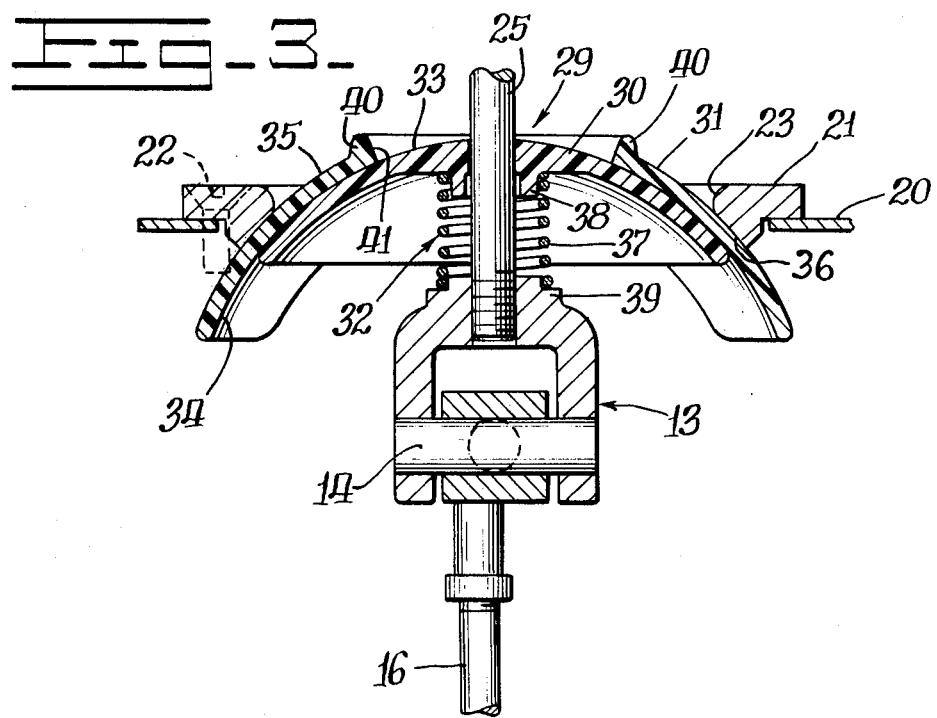

ENVIRONMENTAL SEALS FOR MULTIDIRECTIONAL CONTROL LEVERS

BACKGROUND OF THE INVENTION

1. Field of the Invention

This invention relates to environmental seals and in particular to environmental seals for sealing transversely movable levers and the like across movement-accommodating openings.

2. Description of the Prior Art

In U.S. Letters Pat. No. 3,748,923 of John H. Babbitt, Jr. et al, owned by the assignee hereof, an improved seal assembly for sealing an opening about a transversely movable control element extending through the opening is disclosed. The seal assembly utilizes a stack of sealing plates which are overlapped to bridge the opening through which the control element extends. The plates may comprise spherically segmental plates and an elastomeric washer may be used to apply bias to the plates to reduce vibration.

A slot-closing device utilizing a similar relatively large plurality of sliding plates is shown in the earlier U.S. Letters Pat. No. 1,037,631 of John B. Jones.

The problem of sealing such control levers has become quite acute because of recent legislation which requires improved vehicle environmental operating conditions in connection with heavy duty earth moving equipment and the like. Thus, it is necessary to provide improved means for maintaining an environmental seal about control levers and the like extending through openings which are relatively large so as to accommodate substantial transverse movement of the control members in the operation of the apparatus. One earlier form of such environmental seal was an accordian-like rubber boot. Such boots, however, have the serious disadvantage of susceptibility to fatique and failure, and change in stiffness under different temperature conditions. Further, such boots tend to provide a biasing force on the control lever back to a centered position which, in most instances, is undesirable.

SUMMARY OF THE INVENTION

The present invention comprehends an improved environmental seal for use with multidirectionally movable control members which is extremely simple and economical of construction while yet providing a long-life, maintained environmental seal.

More specifically, the present invention comprehends such an improved environmental seal which may utilize only two transversely movable seal closure elements which are biased into sealing association by a suitable biasing means for effectively closing the opening through which the control lever extends while permitting substantial transverse movement of the control member relative to the opening.

In the illustrated embodiment, the two closure elements are of substantially transverse dimension. The structure is arranged so that both elements need be moved only when a relatively large movement of the control lever is effected thus minimizing the wear of the closure elements in normal use.

The closure elements may be formed of a plastic-like material which, illustratively, may comprise a synthetic resin and may be provided as segmentally spherical elements accommodating universal movement of the control lever about a fixed center.

One of the closure elements may slidably engage the means defining the wall opening through which the lever extends. Stop means may be provided for limiting the movement of this closure element so that upon stopping of the movement, further movement of the lever is accommodated by movement of the second closure element relative to the first closure element. Resultingly, wear between the closure elements is effectively minimized.

The closure elements may be biased into sliding sealing engagement with each other and the outer closure element may be biased into sliding sealing engagement with the wall means by a coil spring coaxially mounted about the lever between the inner closure element and the lever mounting hub.

In a modified form, the movable closure plates comprise discs having cooperating flanges to define the sliding engagement portions therebetween. The wall means may further define a turned flange to be slidably engaged by the second closure plate.

The first closure plate may be arranged to accommodate angular displacement of the control member, or lever, by provision of a knife edge contact portion on the first closure plate extending about the control lever. Alternatively, a ball and socket joint may be provided.

Thus, the invention comprehends providing such a closure element structure which minimizes friction between the elements and the wall means and which provides for universal movement of the control lever while effectively maintaining the desired environmental seal.

BRIEF DESCRIPTION OF THE DRAWING

Other features and advantages of the invention will be apparent from the following description taken in connection with the accompanying drawing wherein:

FIG. 1 is a side elevation partially in section of an apparatus having an environmental seal embodying the invention;

FIG. 2 is a fragmentary horizontal section taken substantially along the line 2—2 of FIG. 1;

FIG. 3 is a fragmentary vertical section taken substantially along the line 3—3 of FIG. 2;

DESCRIPTION OF THE PREFERRED EMBODIMENT

Figure 4:
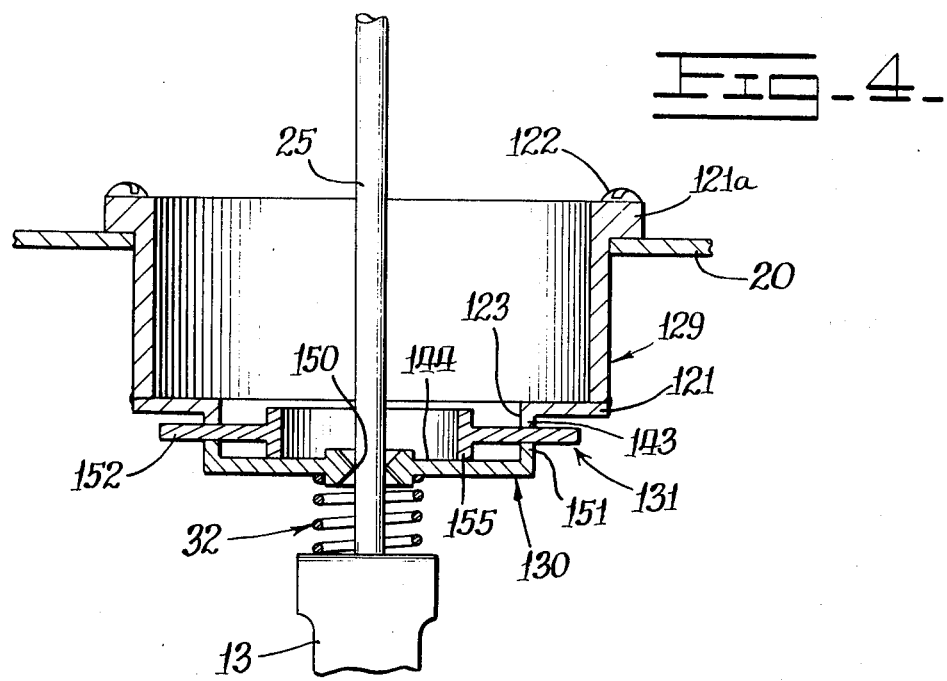
FIG. 4 is a fragmentary vertical section of a modified form of environmental seal embodying the invention.

In the exemplary embodiment of the invention as disclosed in FIGS. 1–3 of the drawing, a control generally designated 10 is shown to include a movable control member, or lever, 11 which is connected to a shaft 12 by a yoke 13 and pin 14. The yoke includes a lever 15 which, in turn, is connected to a control rod 16 by a ball joint 17.

Shaft 12 is mounted on a suitable bracket 18 for rotation about the longitudinal axis thereof. As shown in FIG. 1, bracket 18 is carried on a housing 19 which defines an upper horizontal wall 20 provided with a retainer 21 secured thereto by suitable securing means, such as screws 22. Retainer 21 defines a central opening 23 upwardly through which lever 11 extends. The lever may be provided with a manipulating element, illustratively comprising ball 24, for suitable manual movement of the lever to move lower portion 25 thereof transversely across opening 23 of wall retainer 21.

As shown in FIG. 2, opening 23 in retainer 21 is elongate, i.e., has a transverse dimension greater in the fore-and-aft direction than in the left-to-right direction so as to provide for a different maximum movement of lever 11 in these different directions. As will be obvious to those skilled in the art, any suitable desired opening size and arrangement may be utilized within the scope of the invention.

A lever 26 is fixed to the distal end of shaft 12 and is connected to a second control rod 27 by a ball joint 28. Thus, fore-and-aft movement of control lever portion 25 effects rotation of shaft 12 about its longitudinal axis to swing lever 26 to move control rod 27 longitudinally. Movement of control lever portion 25 in the left-and-right direction pivots yoke 13 on pin 14 suitably to move control rod 16 longitudinally. As will be obvious to those skilled in the art, the control rods may be utilized in the conventional manner to provide desired operational control of associated equipment (not shown).

As indicated briefly above, the present invention comprehends an improved environmental seal for effectively sealingly closing the opening 23 in the upper housing wall defined by the retainer 21. In the illustrated embodiment, the seal, generally designated 29, includes a first closure element, or plate, 30, a second closure element, or plate 31, and means 32 for biasing the closure elements into sealing engagement with each other and with the retainer 21.

Closure element 30 may comprise a segmentally spherical element having an upper surface 33 slidably engaging a lower complementary segmentally spherical surface 34 of second closure element 31. The upper surface 35 of second closure element 31 slidably engages a complementary lower segmentally spherical surface 36 of retainer 21. The sliding surfaces are maintained in facial engagement by the biasing means 32 which illustratively comprises a coil spring 37 disposed coaxially of lever portion 25 and compressed between a spring retainer portion 38 of closure element 30 and a spring retainer portion 39 on yoke 13.

The transverse extent of closure elements 30 and 31 may individually be less than the total transverse extent of the retainer opening 23. However, the cumulative, or additive, extent of the two closure elements is greater than the corresponding transverse extent of the opening whereby the two illustrated closure elements suffice to maintain the opening 23 sealingly closed at all times, i.e., in all positions of the control lever portion 25.

In the illustrated embodiment, upper closure element 31 is provided with an upstanding flange 40 about its inner edge defining a central opening 41 which is substantially larger than the diameter of the control lever portion 25, as best seen in FIGS. 1 and 3. As shown in FIGS. 1 and 2, the spacing between the left and right portions of the flange 40 is substantially equal to the spacing between the corresponding edges of the retainer opening 23 so that the closure element 31 is effectively prevented from left and right movement in the operation of the apparatus. Thus, as shown in FIG. 1, the maximum left and right transverse movement of lever portion 25 is defined by the transverse dimension of closure element 31. As shown in FIG. 3, in the fore-and-aft direction, the spacing between the front and rear edges of opening 23 is substantially greater than the spacing between flanges 40 and, thhus, substantial movement of element 31 in the fore-and-aft direction is permitted to accommodate a substantially greater movement of the control lever portion 25. As will be obvious to those skilled in the art, the extent of movement of the control lever may be accommodated as desired by suitable preselection of the opening and flange configuration within the scope of the invention.

The circumferential extent of the first closure element 30 from the lever portion 25 is preferably at least equal to the radial dimension of opening 41 so that when the control lever is moved into abutment with the flange 40, the closure element 30 extends therefrom fully across the opening to effectively maintain the opening closed in the maximum translated position of the control lever. Thus, the closure of the opening 23 is effected by the cumulative, or additive, extents of the two closure elements to provide the effective environmental seal.

Biasing means 32 is preselected to provide the desired seal engagement between the confronting closure element surfaces 33 and 34, and the retainer surface and the confronting closure element surface 35 and retainer surface 36.

Figure 5:
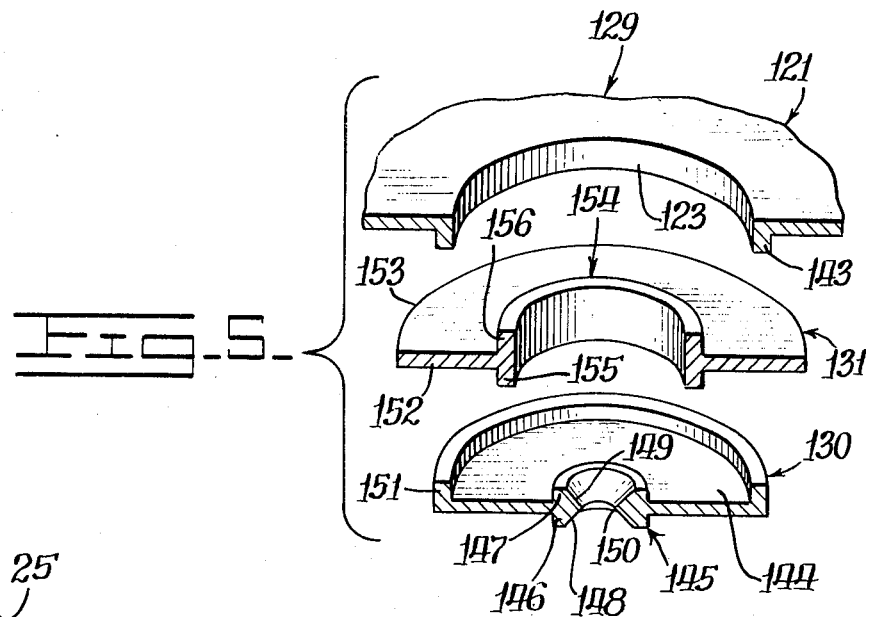
FIG. 5 is a fragmentary exploded view of the cooperating seal elements.

Referring now to the embodiment of FIGS. 4 and 5, a modified form of environmental seal generally designated 129 is shown to comprise an environmental seal generally similar to seal 29 but having a modified closure element and retainer configuration. More specifically, as shown, seal 129 includes a first closure element 130, a second closure element 131, and a retainer 121. As shown, retainer 121 includes an out-turned flange 121a secured to the wall 20 by suitable securing screws 122. The retainer includes a downturned flange portion 143 defining the opening 123 for accommodating the transverse movement of the control lever portion 25.

As best seen in FIG. 5, first closure element 130 defines a disc portion 144 provided with a central annular boss 145 defining a downturned flange 146 and an upturned flange 147. The inner surface 148 of flange 146 is frustoconical narrowing upwardly, and the inner surface 149 of flange 147 is frustoconical narrowing downwardly so as to cooperatively define a knife edge 150 providing a line contact between the control lever portion 25 and the closure element 130.

Closure element 130 defines a peripheral upstanding annular flange 151 which slidably engages the lower surface 152 of a disc portion 153 of second closure element 131. Second closure element 131 is provided with a central annular boss 154 forming a downturned flange 155 and an upturned flange 156. Downturned flange 155 slidably engages disc portion 144 of first closure element 130, as shown in FIG. 4.

Upturned flange 156 is transversely aligned with downturned flange 143 of retainer 121 so as to limit the transverse movement of second closure element 131 across opening 123.

As further shown in FIG. 4, biasing spring 32 extends from yoke 13 to first closure element 130 with downturned flange 146 functioning as a spring retainer portion thereof. The spring biases the first closure element upwardly so as to provide slidable sealing engagement of flange 151 with second closure element surface 152 and flange 155 with first closure element disc 144. At the same time, second closure element disc portion 153 is biased upwardly against flange 143 of retainer 121 to provide a slidable seal therebetween and thereby complete the environmental sealing closure of opening 123.

Seal 129 functions similarly to seal 29 in that transverse movement of control lever portion 25 effects corresponding transverse movement of the first closure element 130 which may subsequently effect transverse movement of second closure element 131 by abutment of flange 151 of the first closure element with flange 155 of the second closure element. Maximum lateral translation of the second closure element is limited by the abutment of flange 156 thereof with the downturned flange 143 of the retainer 121. As discussed relative to seal 29, the specific size and configuration of the elements of seal 129 may be selected as desired within the scope of the invention. Elements of seal 129 which are similar to elements of seal 29 are identified by similar reference numerals except 100 higher. Other than discussed above, environmental seal 129 functions similarly to seal 29.

Figure 6:
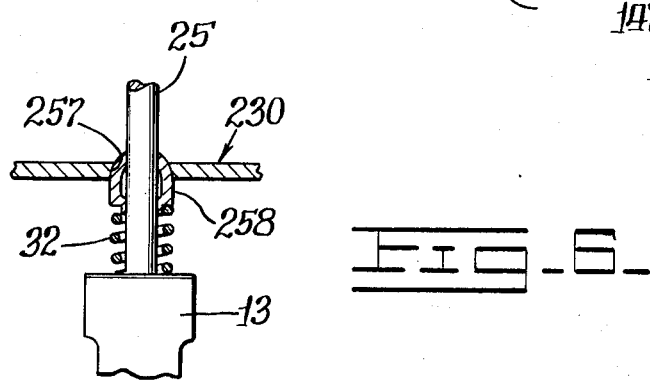
FIG. 6 is a fragmentary section illustrating a modified means for connecting the lever to the seal.

Referring now to FIG. 6, a modified form of connection between the first closure element and the control lever portion 25 is illustrated. As shown, the closure element 230 is provided with a central opening 257 in which is received a spherical bearing 258 which is biased by the spring 32 to effectively define with the closure element a ball joint providing for universal movement of the control lever portion 25 in effecting the lateral translation of the closure element. The ball connection functions generally similarly to the knife edge connection of seal 129 and, thus, in all other respects, the environmental seal is similar and functions similarly with the alternative use with either of the two connections.

The seals of the present invention provide improved environmental sealing of a lever accommodating opening. In utilizing only two relatively movable closure elements, the seals provide for minimum size configuration while yet providing effectively positive long life environmental sealing. The seal elements may be formed of relatively low cost material, such as synthetic resin plastic, which may have self-lubricating characteristics and which may be selected to be shock resistant so as to further maximize the useful life thereof and minimize the service requirements. Alternatively, the seal elements may be formed of other suitable materials, such as metal, and may further serve as thermal insulation means in the sealing action.

The foregoing disclosure of specific embodiments is illustrative of the broad inventive concepts comprehended by the invention.

We claim:

1. In an apparatus having wall means having an opening defined by an edge wall portion, and a movable member extending through and being transversely movable across said opening, and sealing structure for sealingly closing said opening about said movable member including a first closure element extending laterally outwardly from said movable member for movement directly therewith, a second closure element disposed between said first closure element and said wall means and having a first surface portion sealingly slidably engaging said first closure element and a second surface portion sealingly slidably engaging said wall means outwardly about said opening, said second closure element having an opening through which said movable member extends and which is substantially larger in cross section than the portion of the movable member extending therethrough, and means biasing said closure elements into slidable sealing engagement with each other and said second closure element into slidable sealing engagement with said wall means, the improvement comprising a stop flange on said second closure element arranged to engage said edge wall portion of the wall means in a limit position of the second closure element for limiting the movement of said second closure element transversely across said wall means opening, the transverse extent of said elements being preselected to be, in all transverse directions across said wall means opening, cumulatively greater than the transverse extent of said wall means opening whereby said two closure elements maintain said wall means opening effectively sealingly closed in all positions of said transversely movable member.

2. The sealing structure of claim 1 wherein said stop flange comprises an upstanding flange integral therewith said second closure element.

3. The sealing structure of claim 1 wherein each of said closure elements is formed of synthetic resin.

4. The sealing structure of claim 1 wherein said biasing means comprises a coil spring disposed coaxially around said movable member.

5. The sealing structure of claim 1 wherein said biasing means comprises a coil spring disposed coaxially around said movable member and a spring retainer formed integrally with said first closure element.

6. The sealing structure of claim 1 wherein said stop flange includes opposed portions in abutment with said edge wall portion of the wall means for effectively precluding movement of said second closure element in one direction transversely across said wall means opening.

7. The sealing structure of claim 1 wherein said first and second closure elements include further cooperating flange portions for effecting movement of said second closure element as a result of movement of said first closure element by said movable member.

8. The sealing structure of claim 1 wherein said first and second closure elements include further cooperating continuous flanges for effecting movement of said second closure element as a result of movement of said first closure element by said movable member.

9. The sealing structure of claim 1 wherein said wall means opening is defined by a downwardly turned flange and said second closure element defines an inner flange upstanding about the opening therein for movable abutment with said wall means flange.

10. The sealing structure of claim 1 wherein said first closure element defines an annular knife-edge abutting said movable member for causing movement of said first closure element by said movable member.

11. The sealing structure of claim 1 wherein said movable member and first closure member are provided with cooperating ball joint connecting means for effecting movement of said first closure element by said movable member.

12. The sealing structure of claim 1 wherein said closure elements are segmentally spherical.

13. The sealing structure of claim 1 wherein said wall means opening is elongated.

14. The sealing structure of claim 1 wherein said wall means includes a removable annular element defining said opening thereon.

15. The sealing structure of claim 1 wherein said first closure element comprises a disc element having a central boss defining an opening coaxially fitted to said movable member, and an outer peripheral flange slidably engaging said second closure element.

16. The sealing structure of claim 1 wherein said second closure element comprises a disc element having a central bore defined by a downturned flange slidably engaging said first closure element.

* * * * *